United States Patent [19]
Curtis et al.

[11] Patent Number: 4,987,858
[45] Date of Patent: Jan. 29, 1991

[54] ANIMAL FEEDING DEVICE

[75] Inventors: Stanley E. Curtis, Mahomet; Ian A. Taylor, Champaign, both of Ill.

[73] Assignee: The Board of Trustees of the University of Illinois, Urbana, Ill.

[21] Appl. No.: 244,031

[22] Filed: Sep. 14, 1988

[51] Int. Cl.$^5$ .............................................. A01K 5/00
[52] U.S. Cl. ...................................................... 119/54
[58] Field of Search .................... 119/52 R, 52 A, 54, 119/56 R, 51 R, 53.5

[56] References Cited

U.S. PATENT DOCUMENTS

| | | | |
|---|---|---|---|
| 1,355,435 | 10/1920 | Unger et al. | 119/54 |
| 1,569,990 | 1/1926 | Lovering | 119/54 |
| 2,533,538 | 12/1950 | Uhrenholdt | 119/54 |
| 4,825,811 | 5/1989 | O'Kelley | 119/51.5 |

FOREIGN PATENT DOCUMENTS

| | | | |
|---|---|---|---|
| 134973 | 9/1947 | Australia | 119/53 S |
| 2819403 | 11/1978 | Fed. Rep. of Germany | 119/54 |
| 3202756 | 8/1983 | Fed. Rep. of Germany | 119/52 R |
| 309473 | 8/1955 | Switzerland | 119/52 |
| 12056 | of 1884 | United Kingdom | 119/52 R |

OTHER PUBLICATIONS

Taylor, I. et al., J. Animal Sci., 66 (Suppl. 1):242 (1988).
Taylor, I. et al., National Hog Farmer, 33:24–28 (1988).
Taylor, I. et al., J. Animal Sci., 65 (Suppl. 1):223 (1987).
Advertisement (3 pages) for device manufactured by Farmweld, Inc., P.O. Box 532, Teutopolis, Ill. 62467.
Advertisement (2 pages) for the Sow Saver Feeder, manufactured by Sollars Bros., Inc., 309 South Main St., Washington Court House, Ohio 43160.
Advertisement (1 page) for a device manufactured by Lou Mfg., Inc.–National Hog Farmer; p. 92; Mar. 15, 1989.
Advertisement (2 pages) for a device manufactured by Vittetoe Inc.–Best Copy Available.
New Product Release Mailing (3 pages) for a device manufactured by Farmweld, Inc., P.O. Box 1B, Teutopolis, IL 62467.
New Product Release (2 pages) for a device manufactured by S. G. Mfg., Inc. Appearing in National Hog Farmer, 33(11):79 (1988).
Advertisement (2 pages) for a device manufactured by Modern Hog Concepts, Iowa Falls, IA 50126–Appearing in Hog Farm Management, 26(6):61 (Jun. 1989).

*Primary Examiner*—Robert P. Swiatek
*Attorney, Agent, or Firm*—Marshall, O'Toole, Gerstein, Murray & Bicknell

[57] ABSTRACT

The present invention provides a novel feeder which readily accommodates the three-dimensional space-envelope described by the normal range of feeding movements of a feeding animal, minimizes eating movements that are wasteful of feed, and prevents injury to the feeding animal. The feeder optionally incorporates a novel, feed-dispensing mechanism which can be removed from the throat of the feeder reservoir. The mechanism has a series of removable adjacent tubular segments, such as cylindrical rings, through which runs a removable rigid support, such as a rod. When unactuated, the mechanism completely occludes the throat of the feeder. When a feeding animal displaces the segments upwardly, feed passes through the opening created in the throat of the feeder. When the segments return to their original position by the force of gravity, the feeder throat is occluded and feed flow stops.

14 Claims, 3 Drawing Sheets

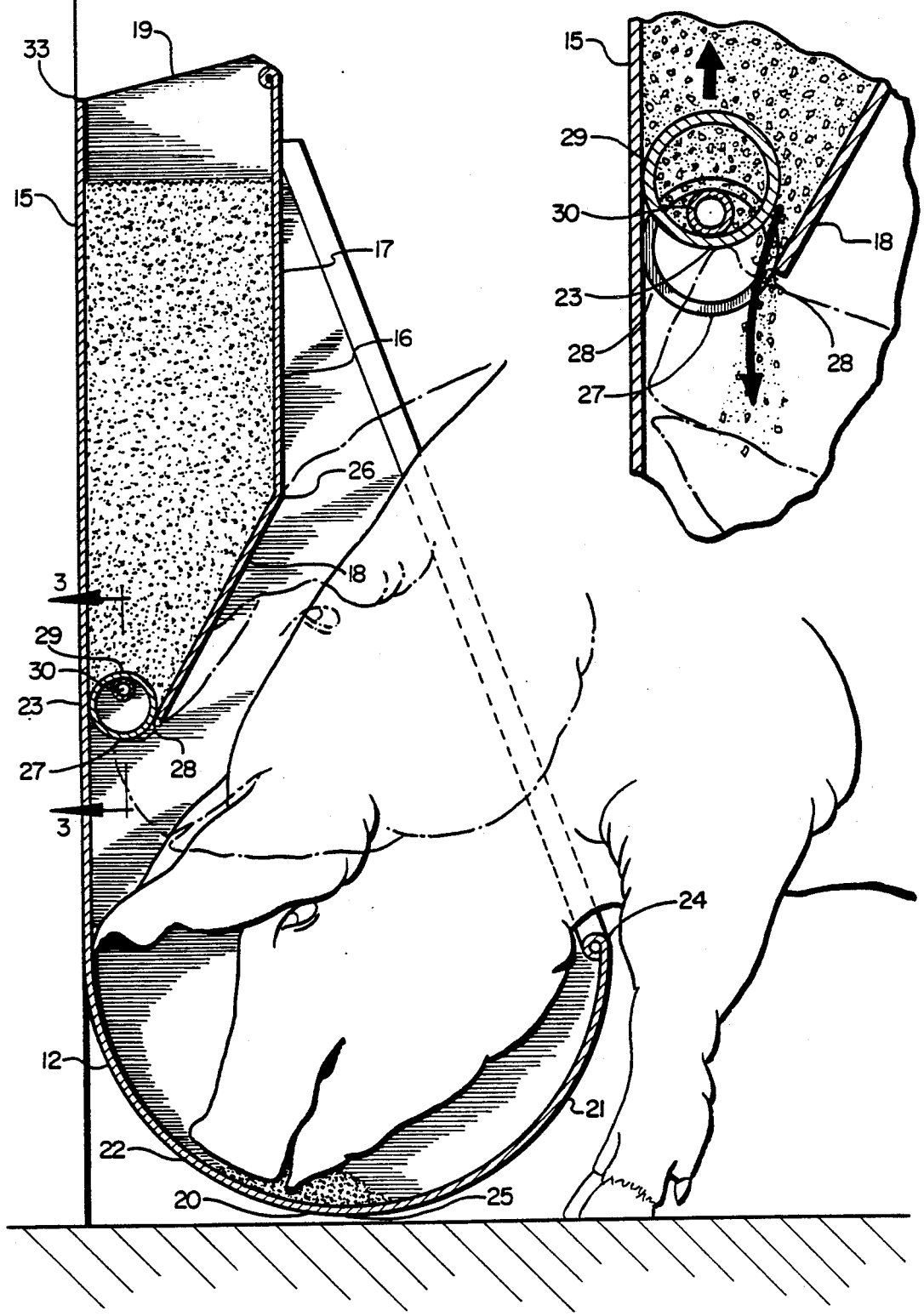

ANIMAL FEEDING DEVICE

BACKGROUND OF THE INVENTION

The present invention relates generally to animal feeding devices, and more particularly to a sow feeding device which reduces feed wastage and sow injury.

Animal feeding devices are commonly designed to include an enclosed feed storage hopper, a feeding trough and an actuable means for transferring feed from the hopper to the trough. Variously effective sow feeder designs have been described. For example, Taylor, I., et al., *Nat'l. Hog Farmer,* 33:24–28 (1988), studied ten sow feeder designs and observed feed wastage ranges of from as high as 1 to 38% to as low as 0.1 to 8%. A 1% feed wastage is estimated to amount to over 1 ton of feed wasted per 100 sows per year. The authors also noted differences among feeders in terms of injury to the animal, and injury and inconvenience to the herdsman.

Some designs cause feed bridging and lodging in the passage ways of the feeder resulting in excessively slow feed flow, feed contamination, spoilage, and wastage. Certain feed-delivery mechanisms are overly intricate and cause feed to jam within the throat of the hopper causing erratic feed delivery. Where a feeder does not have an effective way to slow feed flow, the more feed put before the sow at any one time, the greater the chance for feed wastage as the sow roots around and carries feed out on its snout. For some designs, any moisture present in the trough can be wicked up the feed-delivery column causing feed to "set-up" and necessitating disassembly of the unit. Other feeder designs feature actuable mechanisms that are susceptible to corrosion by moisture, by salt in the feed, by animal saliva and manure acids and/or require continual maintenance.

Certain feeding devices do not "fit" most sows and as a result the sows tend to "throw" feed everywhere as they feed. For some designs, feed rooted around in the feeder tends to fall back to an area inaccessible to sows. Confining, space-restrictive, shallow designs require a sow to jam its head down diagonally as it eats, leading to rubbing and raw spots on the brow and near the base of the ears. Very restricted access to feed, i.e., an entry area simply too small for many sows and a feeding surface too deep, can lead to severe abrasions of the sow's snout, brow, and jowl. Further, those mechanisms with protruding rods and the like, can rub the sow's jowl as the sow pushes into the feeding device; also, these rods can trap substantial amounts of feed making it inaccessible to the sow and resulting in additional feed wastage. Exposed sharp edges, along with exposed bolt heads, can also lead to injury especially with very anxious or large sows.

Even the least wasteful feeding device studied by Taylor, I., et al., supra, resulted in feed wastage of from 0.1% to 8%. This device, manufactured by Farmweld, Inc., P.O. Box 532, Teutopolis, Ill. 62467, utilizes a hollow agitator pipe to dispense feed. Although the pipe slows feed delivery to the sow, it can jam in the throat of the hopper, either in the up or down position, and can cause erratic feed delivery. Also, feed can accumulate within the hollow of the agitator pipe thereby reducing the pipe's range of displacement until little or no feed can be delivered. This is a particular problem with diets having a relatively high fat or oil content, having a high moisture content and/or having a small particle size (i.e., fine grind). Yet, another disadvantage associated with the mechanism of this device is that when the feed hopper is completely full, the entirety of the feed weight rests on the pipe that must be lifted by the sow to dispense feed. For some sows, this excessive weight presents considerable difficulty and poses an additional risk of injury to the snout. Another shortcoming of this device is that the overall internal dimensions are not sufficiently large to completely accommodate the sow; although some of the internal 90° angles have been eliminated with the addition of extra panels and converted to 45° angles, it is still difficult for some sows to maintain complete access to feed trapped in the recesses of the trough. Furthermore, use of this device by larger or more anxious sows sometimes leads to distortion of susceptible metal panels and the eventual concomitant failure of the feed delivery mechanism.

Another commercially available feeding device is the Sow Saver Feeder, manufactured by Sollars Bros., Inc., 309 South Main Street, Washington Court House, Ohio 43160. This device utilizes a feed dispensing mechanism involving a roller tube which, when activated by the sow's snout, displaces a hinged agitator. The agitator, which also serves as the hopper bin bottom, keeps feed from bridging and serves as a guide for the roller. Because the device has a taller hopper bin to contain larger quantities of feed, a baffle plate is required to reduce the weight of the feed on both the agitator and on the roller tube. Accommodating differences among sow feeding patterns nessitates the addition of a further "feed drop control" mechanism. However, the mechanism must be removed from the feeding device to accomodate those sows incapable of using the mechanism. Also, from a maintenance and hygiene standpoint, the shape and means of forming the bowl area, the use of open riveted seams and the cavities and blind corners created by this combination, along with the intricate nature of the feed delivery mechanism, result in areas that are difficult to thoroughly clean and that may harbor pathogenic organisms.

Thus there continues to exist a need in the art for animal feeding device which reduce animal injury, minimize feed wastage and are convenient and safe for the herdsman.

BRIEF SUMMARY OF THE INVENTION

The device of the present invention provides a novel feeding device which generally comprises a feed reservoir, a trough, and an actuable feed dispensing mechanism all of which are operably connected so as to provide a structure which readily accommodates the three-dimensional space-envelope described by the normal range of feeding movements of the feeding animal and thereby prevents injury to the animal. More particularly, the sow feeding device of the invention provides adequate headroom; allows the sow to swallow with its mouth above or in the device; provides feed accessibility at, or near, floor level; provides for automatic re-collection of feed to a focal point which is readily accessible to the sow; has no blind corners; and is free of protruding bolts, nuts, and sharp edges.

In a preferred embodiment, the device of the invention optionally incorporates a novel feed-dispensing mechanism which is effective for providing a controlled delivery of feed rations. In operation, feed is placed in the overhead feed reservoir and the sow actuates the feed dispensing mechanism to obtain feed. The feed dispensing mechanism, removably situated in the throat of the feed reservoir, comprises a series of removable adjacent tubular segments, preferably cylindrical ring segments, through which runs a removable rigid support means, such as a rod. In the un-actuated state, the feed dispensing mechanism substantially occludes the throat of the feeder. Each of the segments can be independently displaced upwardly into the feed reservoir when pushed by the feeding animal's snout. The upward displacement of the segments creates an opening in the throat of the feed reservoir through which feed can then pass. When the segments return to their original position by the force of gravity, the throat is once again occluded and feed flow stops.

The removable segments, the removable rod, and the spaces between the segments all can be adjusted to modify the degree and extent of displacement of the segments and consequently the amount of feed dispensed. Thus, in yet another conformation of the invention, these removable segments can be replaced with segments that are narrower, and/or that have a larger internal diameter and/or external diameter and/or that can protrude more deeply into the feed reservoir; and/or the removable rod support means can be replaced with a rod support means having a smaller diameter. This conformation is particularly useful for increased feed delivery or for use with feed requiring a larger aperture to flow through, such as high fat or high moisture content feeds, or coarser consistency feeds, such as pelleted or cubed feeds. The "feed" as depicted in FIGS. 2 and 2A is for illustrative purposes and is in no way intended to indicate limitations on the type and/or consistency of feeds usable in this device as the device can be appropriately adjusted to accommodate other feed types and/or consistencies. In another conformation, particularly useful for decreasing the amount of feed delivered, or, for delivery of a less coarse feed, a larger diameter rod support means can be used, and/or segments with wider and/or smaller internal and/or external diameters, and/or segments protuding to a lesser extent into the feed reservoir can be used, thereby reducing the range of displacement of the segments.

The animal feeding device of the invention can be free standing or can be connected to a crate by means of a gate which can be singly or doubly hinged to the right and/or to the left. The feeding device is positioned for optimal access to the feeding animal and can be mounted to the crate via a pivot point so the feeder can be tipped out for cleaning.

Other aspects and advantages of the present invention will be apparent upon consideration of the following detailed description, reference being made to the following drawing.

BRIEF DESCRIPTION OF THE DRAWING

FIG. 2 is a sectional view, partially cutaway, of the animal feeder taken along the line 2—2 of FIG. 1, including views of the sow in feeding and actuating positions;

FIG. 2A is an enlarged, fragmentary, sectional view illustrating actuation of the feed dispensing mechanism;

DETAILED DESCRIPTION

Figure 1:
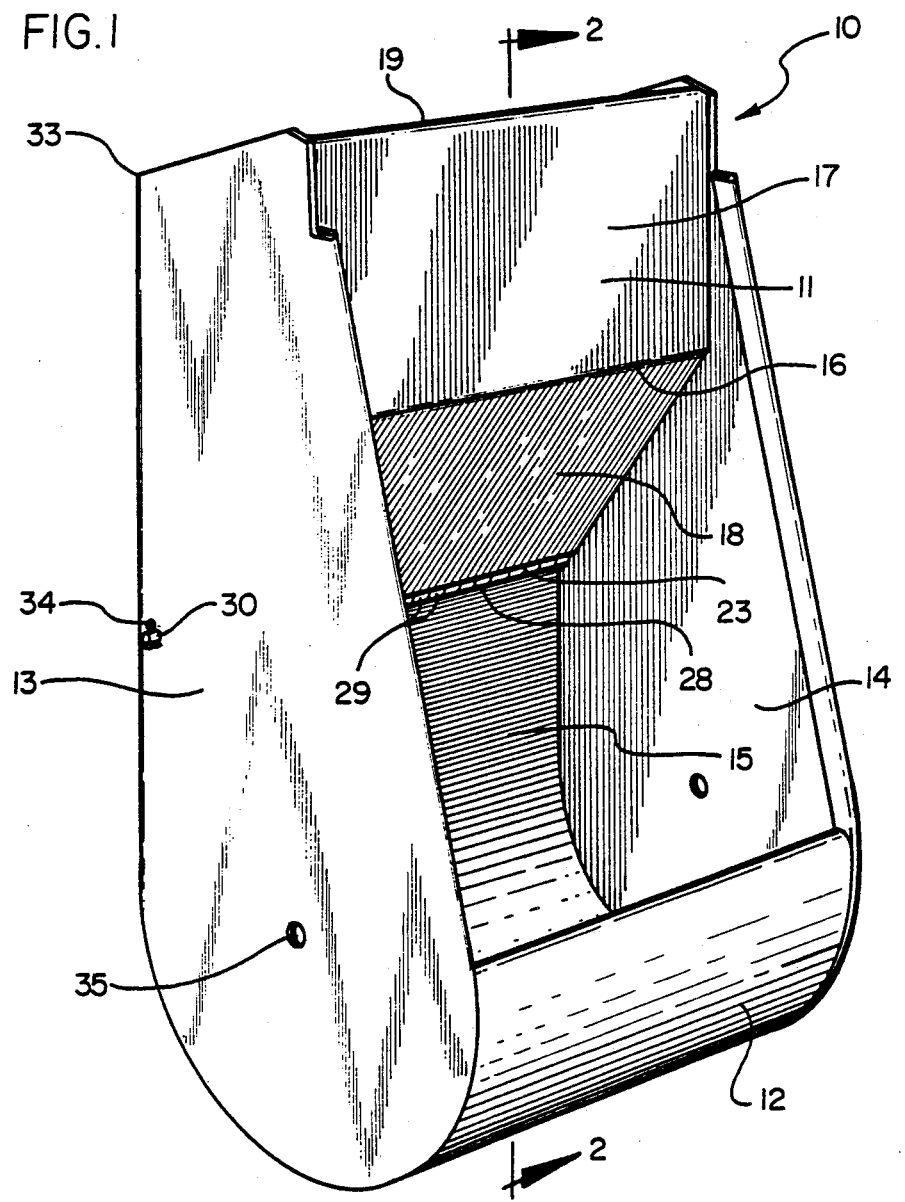
FIG. 1 is a perspective of an assembled animal feeder embodying the present invention.
Figure 3:
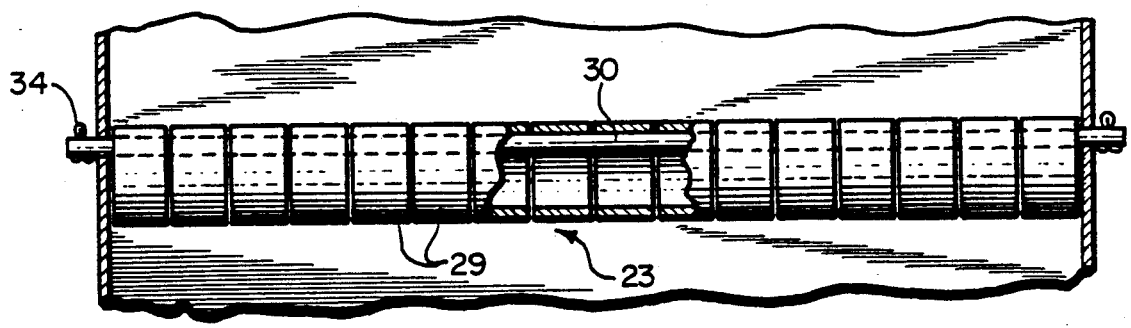
FIG. 3 is a fragmentary front view of the animal feeding device, partially in section, detailing the feed dispensing mechanism.

The following description illustrates practice of the invention which provides novel and improved devices for the feeding of animals with minimal feed wastage and minimal injury to the animal. The description is not intended in any way to limit the scope of the invention.

Dimensional data necessary for designing the shape and size of the feeding devices of the invention are derived through spatial analysis of the eating movements of a representative sampling of the animals for which the feeding device is intended. For example, information regarding the kinematics of head, neck, and forelimb motion during feed ingestion have been characterized for sows and pigs with reference to their potential utility in developing feeding device design criteria. Taylor, I., et al., *J. Animal Sci.*, 65 (Suppl. 1):223 (1987); and Taylor, I., et al., *J. Animal Sci.*, 66(Suppl. 1):242 (1988). The feeding device is then designed so that its structure does not intrude upon, but rather accommodates, within close tolerances, the three-dimensional space envelope described by the "triad" formed by the animal's snout tip, nuchal crest or frontal eminence, and angle of mandibile during the natural range of eating movements of the animal for which the device is intended. As used herein, the terms nuchal crest and fontal eminence refer to the upper most protruding point of the skull when the animal of interest is in its feeding position. That is, the overall shape of the feeding device, particularly the interior dimensions of the trough and the relative positionings of the reservoir and the feed dispensing mechanism, is such that it will accommodate the range of motion associated with normal feeding of the 95th percentile for the weight range and animal of interest, when the animal is offered feed at ground/floor level in a relatively unobstructed manner, and will thereby avoid animal injury and minimize feed waste.

Specifically, the feeding device design orients the prehensile phase of ingestive behavior to a focal point. Feed drops to this focal point not only via the dispensing mechanism but also as a result of the animal's natural eating movements. This focal point of feed concentration is located in an area of optimal access to that animal species and weight range for which the feeding device is intended and depends both upon the anatomy of the particular animal species and upon the feeding position(s) most favored by that species.

Similarly, the optimal positioning of the feed-dispensing mechanism of the feeder depends upon the anatomy of the particular animal species. The placement and design of the dispensing mechanism is intended to limit the quantity of feed which collects at the focal point of the feeding device over time for a less wasteful ingestive process. Generally, the feed-dispensing mechanism is placed sufficiently low to allow access to the feeding animal via a generally upward motion of the snout/nose from the focal point to the dispensing mechanism, and yet is placed sufficiently high to require an intentional action by the animal to produce delivery of feed from the overhead feed reservoir.

FIGS. 1, and 2, show an animal feeding device 10 which comprises a feed reservoir 11, a trough 12, a rear panel 15 extending between two opposedly facing side panels 13 and 14, a V-shaped front panel 16 having an upper section 17 and a lower section 18, and extending between said side panels, an optional top panel 19 and an actuable feed dispensing mechanism 23. The side panels 13 and 14 of the feeding device are imperforate to enclose the feeding process and are positioned sufficiently far apart to readily accomodate the feeding animal's shoulders during its natural feeding movements; this accommodation prevents excessive feed spillage. The overall width of the feeder can be incrementally increased to allow for multiple feeding positions for groups of animals maintained together in pens or in a pasture.

The rear panel 15 and the V-shaped front panel 16 are positioned to form the throat 28 of the feed reservoir. The upper portions of the two oppposedly facing side panels 13 and 14 form the sides of the reservoir. Optionally, the top panel 19 may be attached to the upper edge of the rear panel of the feed reservoir 11 by means of a hinge 33. If alley space is not of concern, then the front panel need not be V-shape and instead can be substantially straight; in addition, the rear panel 15 can be V-shaped to increase the volume capacity of the hopper; in this configuration, the bulk of the feed hopper is on the side furthest from the feeding animal. Although the front panel is preferably V-shaped (and/or optionally, the rear panel is V-shaped), other shapes will be similarly effective, particularly if the angle formed between the upper section 17 and the lower section 18 of the V-shaped front panel 16 generates a slope which preferably is equal to or greater than that of the angle of repose of the feed. The angle of repose for a given feed material is that angle formed by the surface of a freely formed pile of material with the horizontal. For example, for a typical sow feed, such as a 14% protein ground corn-soy diet, the angle of repose is 60°. Therefore, this feed will most readily slide on an inclined plane of 60° or more. Because animal clearance of the feeding device is of primary concern in the design of the device, if necessary the angle can be maintained by movement of the whole panel upward so that clearance, as well as the desired angle, are achieved.

The furthest forward, i.e., towards the feeding animal, projection point 26, of the front panel 16 of the feed reservoir 11, is ideally positioned so as to minimize contact with the feeding animal, particularly the head or neck, during the entire range of movements of ingestive behavior (FIG. 2). Further, the positioning and the angling of the inclined lower section 18 of the front panel 16, i.e., the segment between points 26 and 27, is designed to permit the animal to engage in normal ingestive movements, including actuation of the feed dispensing mechanism, and to minimize contact between the animal and the lower section of the panel 18.

Figure 4:
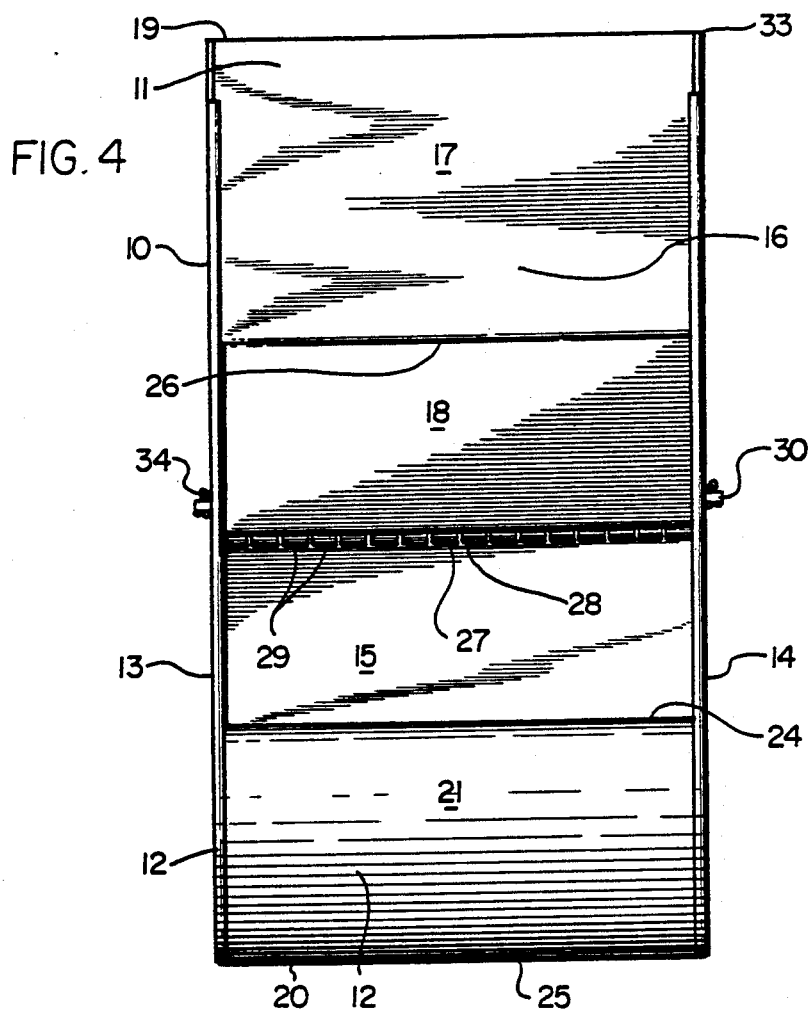
FIG. 4 is a front view of the entire feeding device.
Figure 5:
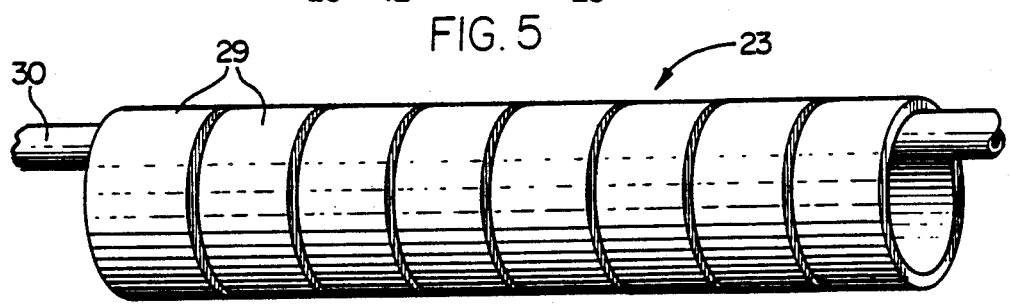
FIG. 5 is an enlarged perspective of the feed dispensing mechanism in a static condition.

The feed dispensing mechanism 23, which extends perpendicularly between the side panels 13 and 14, is secured by a fastening means 34 (FIGS. 1 and 4), which fastening means allows for complete removal as well as for optional repositioning of the mechanism to the desired one of multiple heights, within the throat of the reservoir 28 between the rear panel 15 and the lower section 18 of the front panel 16. The mechanism 23 is positioned in the throat 28 to block feed flow when the mechanism is in the un-actuated position (FIG. 2A).

The throat of the reservoir, and therefore the height of the feed dispensing mechanism, is positioned at a height from the ground that is at least equal to the distance from the front to the back of the feeding device, i.e., that distance (discussed in greater detail, infra) described by the diameter of the semicircle formed by 24, 21, 25, 20, and 22 (FIG. 2).

The feed dispensing mechanism 23, comprises a series of adjacent tubular segments 29 through which runs a rigid support rod 30 (FIGS. 2, 2A, 3, 5, and 6). While cylindrical ring segments have been shown, segment shapes (with rounded points) other than cylindrical may be similarly effective. These include star, prismatic, elliptical, as well as spherical, and ovoid shapes. The outside diameter of the support rod 30 is less than the inside diameter of the cylindrical ring segments 29 to allow each of the segments to be independently displaced upwardly into the feed reservoir when pushed by an animal's snout from below (FIG. 2A). As used herein, the term "snout" is also intended to mean nose. Such action results in opening a portion of the feed reservoir's occluded throat. FIG. 2A shows the upward displacement of one such segment and the opening thereby created in the throat. The size of the opening created in the throat is proportional to the number of segments displaced and to the extent of the segments' displacement, which in turn determines the amount of feed dispensed into the trough. The segments return to their original resting place as a result of gravity and upon the animal's ceasing to displace the segments. The internal shape of the segments is preferably circular but can be any shape, e.g., elliptical, ovoid, which is effective in creating the desired feed dispensing action.

The feed dispensing mechanism can be adjusted, to accommodate the flow characteristics of the type of feed being used by modifying the segments and/or the support rod, thereby widening or narrowing the feed flow aperture created in the throat of the feeder. For example, the amount of feed dispensed per displacement operation can be adjusted by altering the throat depth, i.e., altering the outside diameter and/or the width of the cylindrical segments, and the outside diameter of the rigid support rod (e.g., via the addition of appropriately sized sleeves). Furthermore, the free space between adjacent segments can be adjusted to modify the degree of displacement of the segments and to facilitate the use of various feeds having various particle sizes and water content. In addition, the feed flow can be adjusted by modifying the ease with which the animal can displace the segments. For example, weighted or spring-loaded segments can be used. Also, the relative height (from the standing surface) of the support rod can be adjusted by re-positioning the rod, either upward or downward, between the side panels 13 and 14. By all of these means, the feed dispensing mechanism can be adjusted to accommodate various feed types and particle sizes as well as the particular animal's eating movements and its particular life cycle stage feeding needs.

Figure 6:
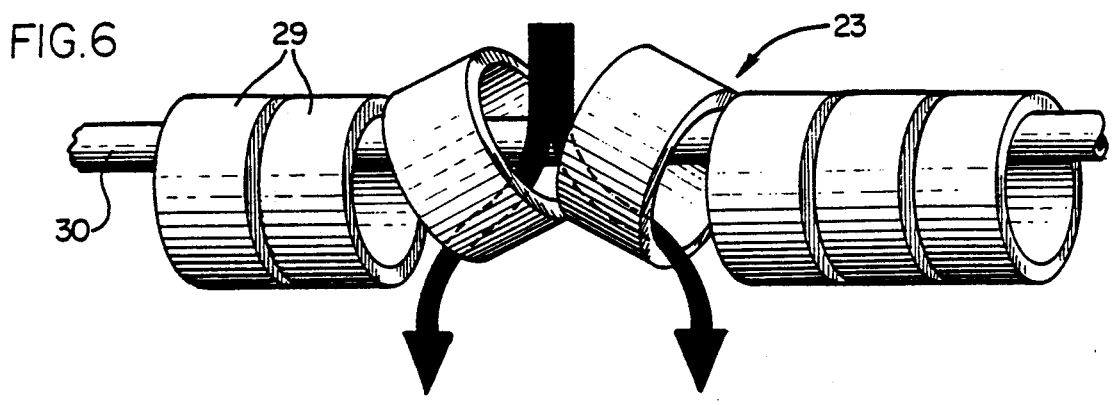
FIG. 6 is an enlarged perspective of the feed dispensing mechanism in an operative condition.

FIG. 6, which depicts the segments in one of many possible actuated positions, demonstrates another important aspect and advantage of the dispensing mechanism. The segment arrangement facilitates a self-cleaning action which prevents the accumulation of feed within cylindrical segments 29. With every displacement from, and return back to the normal position, the cylindrical segments are sufficiently jostled and collided into adjacent segments so as to free any feed which may adhere to the segments or the dispensing mechanism. Although a particular feed dispensing mechanism has been depicted and described, it is foreseen that other dispensing mechanisms could be adapted for use with the spatial design of the feeding device of the invention.

The trough 12 of the feeder, includes a base portion 20, an upwardly projecting front portion 21, and an upwardly projecting rear portion 22, depending from the lower portion of the rear panel 15 of the reservoir and angularly disposed from the base portion 20, and disposed between the lower portion of the two side panels 13 and 14 (FIG. 2). The trough is not only configured to dispose the rear portion 22 from the base portion 20, preferably by an angle at least equal to the angle of repose of the feed, but is also configured so as to generate sufficient space to accomodate and not obstruct the arc of movement of the animal's snout from a focal point 25 upward to feed mechanism 23. The feedgathering, or focal, point 25 of the device is that point in the trough to which un-ingested feed gravitates either upon being dispensed from the overhead feed reservoir or as a result of the normal eating movements of the animal. The interior of trough 12 is rounded so that no blind spots are generated and is preferably of sufficient width so that all feed which may collect in the trough is readily accessible to the feeding animal.

The extended arc of the trough, described by locations 24, 25, and 23, is sufficiently large to allow the feeding animal to swing its snout upwardly to activate the feed dispensing mechanism 23 and then to swing its snout downwardly back to the focal point 25 without coming in substantial contact with the feeding device during this range of motion. The front-to-back depth of the device, i.e., the diameter of the semicircle formed by locations 24, 21, 25, 20, and 22, is slightly greater than the distance from the nuchal crest/frontal eminence (that midway point located on the ridge on the skull running approximately between the base of each ear) to the tip of the animal's snout for the 95th percentile of the weight range and animal of interest, or just larger than the length of the mandible, measured from the mandibular angle to the lip at the mandibular tip, for the 95th percentile weight range and animal of interest.

The front lip 24 of the trough (FIG. 2) is of a height from the surface on which the animal stands, and is of an outward projection, towards the feeding animal, so as to contain feed within the feeding device but not so high and/or so outwardly projecting as to prevent the animal from adopting a natural feeding posture. Generally, the height of the front lip 24 of the trough is no greater, and, preferably less, than the distance from the surface on which the animal stands to the animal's sternum. More particularly, the height of the front lip 24 is at least equal to the radius of the semi-circle formed by locations 24, 21, 25, 20, and 22, or, stated alternatively, the height is at least half the front to back depth of the feeder, and is less than the distance from the standing surface, i.e., the floor, to the animal's sternum for the 95th percentile of the weight range and animal of interest. The trough design comprises those dimensions that minimize contact, particularly of the animal's sternal or ventral neck surfaces or throat or jaw, with the front lip of the trough when the feeding animal assumes a natural feeding posture.

The animal feeding device of the invention can be either free standing or connected to a crate by means of a gate. The device is mounted such that location 25 is at or only slightly above the surface upon which the feeding animal stands. If mounted onto a gate, the gate can be singly and/or doubly hinged to either side. Optionally, the device can be mounted to the crate via a pivot point 35 (FIG. 1) so that the feeding device can be readily tipped out for cleaning.

Numerous modifications and variations in the invention as described above are expected to occur to those skilled in the art and consequently only such limitations as appear in the appended claims should be placed thereon. Accordingly, it is intended in the appended claims to cover all such equivalent structural variations which come within the scope of the invention as claimed.

What is claimed is:

1. A mechanism for dispensing animal feed from a feed reservoir, having a lower end and a throat at said lower end, to a position substantially below said reservoir, said feed dispensing mechanism comprising:

an internal support member;

means mounting said support member at said throat;

a plurality of tubular segments disposed in adjacent, hanging relation around said support member;

said segments and said support member comprising means cooperating to mount each segment for vertical and lateral movement between a first position, wherein said segments jointly substantially occlude flow of feed from said reservoir through said throat, and a second position, displaceable from said first position, wherein said segments are displaced and allow feed to flow from said reservoir through said throat and to a position substantially below said reservoir;

said mounting means for said segments comprising means permitting tilting of individual segments;

said dispensing mechanism being devoid of external restraints against said tilting.

2. The feed dispensing mechanism as recited in claim 1 wherein:

there is a free space between adjacent tubular segments to accommodate said movement.

3. The feed dispensing mechanism as recited in claim 1 wherein:

said segments extend substantially upwardly into said feed reservoir when said segments are in said second position.

4. The feed dispensing mechanism as recited in claim 1 wherein:

said segments are normally urged to their first position by gravity; and said segments are movable from their first position to their second position in response to upward motion thereagainst by said feeding animal.

5. The feed dispensing mechanism as recited in claim 1 wherein:

said tubular segments comprise cylindrical rings.

6. The feed dispensing mechanism as recited in claim 1 wherein:

said support member comprises a rod.

7. The feed dispensing mechanism as recited in claim 1 wherein said support member diameter is less than said tubular segments' diameter.

8. The feed dispensing mechanism as recited in claim 1 wherein:

said movement of said segments to their second position creates an opening in said throat;

and the size of said throat opening is proportional to the number of segments in said second position.

9. In an animal feeding device including a feed reservoir, a trough located below said reservoir, and a mechanism actuable by a feeding animal for dispensing feed from said reservoir into said trough, wherein said feeding device is for use with a feeding animal which, during feeding and activation of said feed-dispensing mechanism, generates a three-dimensional space envelope as a result of said feeding animal's natural range of feeding movements, the improvement wherein:

said reservoir and said trough comprise means cooperating to accomodate said three-dimensional space envelope and to accomodate said feeding animal without substantial intrusion into said space envelope;

said reservoir has a lower end and has a throat at said lower end of said reservoir;

said feed dispensing mechanism is located at said throat; and said feed dispensing mechanism comprises:

an internal support member;

means mounting said support member at said throat;

a plurality of tubular segments disposed in adjacent, hanging relation around said support member;

said segments and said support member comprising means cooperating to mount each segment for vertical and lateral movement between a first position, wherein said segments jointly substantially occlude flow of feed from said reservoir through said throat, and a second position, displaceable from said first position, wherein said segments are displaced and allow feed to flow from said reservoir through said throat and into said trough;

said mounting means for said segments comprising means permitting tilting of individual segments; said dispensing mechanism being devoid of external restraints against said tilting.

10. An animal feeding device as recited in claim 9 wherein:

there is a free space between adjacent tubular segments to accomodate said movement.

11. An animal feeding device as recited in claim 9 wherein:

said segments extend upwardly into said feed reservoir when said segments are in said second position.

12. An animal feeding device as recited in claim 9 wherein:

said segments are normally urged to their first position by gravity;

and said segments are movable from their first position to their second position in response to upward motion thereagainst by the snout of said feeding animal.

13. An animal feeding device as recited in claim 9 wherein:

said tubular segments comprise cylindrical rings.

14. An animal feeding device as recited in claim 9 wherein:

said movement of said segments to their second position creates an opening in said throat;

and the size of said throat opening is proportional to the number of segments in said second position.

* * * * *

UNITED STATES PATENT AND TRADEMARK OFFICE
CERTIFICATE OF CORRECTION

PATENT NO. : 4,987,858

DATED : January 29, 1991

INVENTOR(S) : STANLEY E. CURTIS, ET AL.

It is certified that error appears in the above-identified patent and that said Letters Patent is hereby corrected as shown below:

Column 7, line 13, "feedgathering" should be --feed gathering--.

Signed and Sealed this

Twenty-fourth Day of November, 1992

Attest:

DOUGLAS B. COMER

Attesting Officer

Acting Commissioner of Patents and Trademarks